March 12, 1968  D. A. BRISTOL  3,372,594
COMPENSATION SYSTEM FOR DIFFERENTIAL PRESSURE MEASURING DEVICE
Filed April 11, 1966
FIG. 1
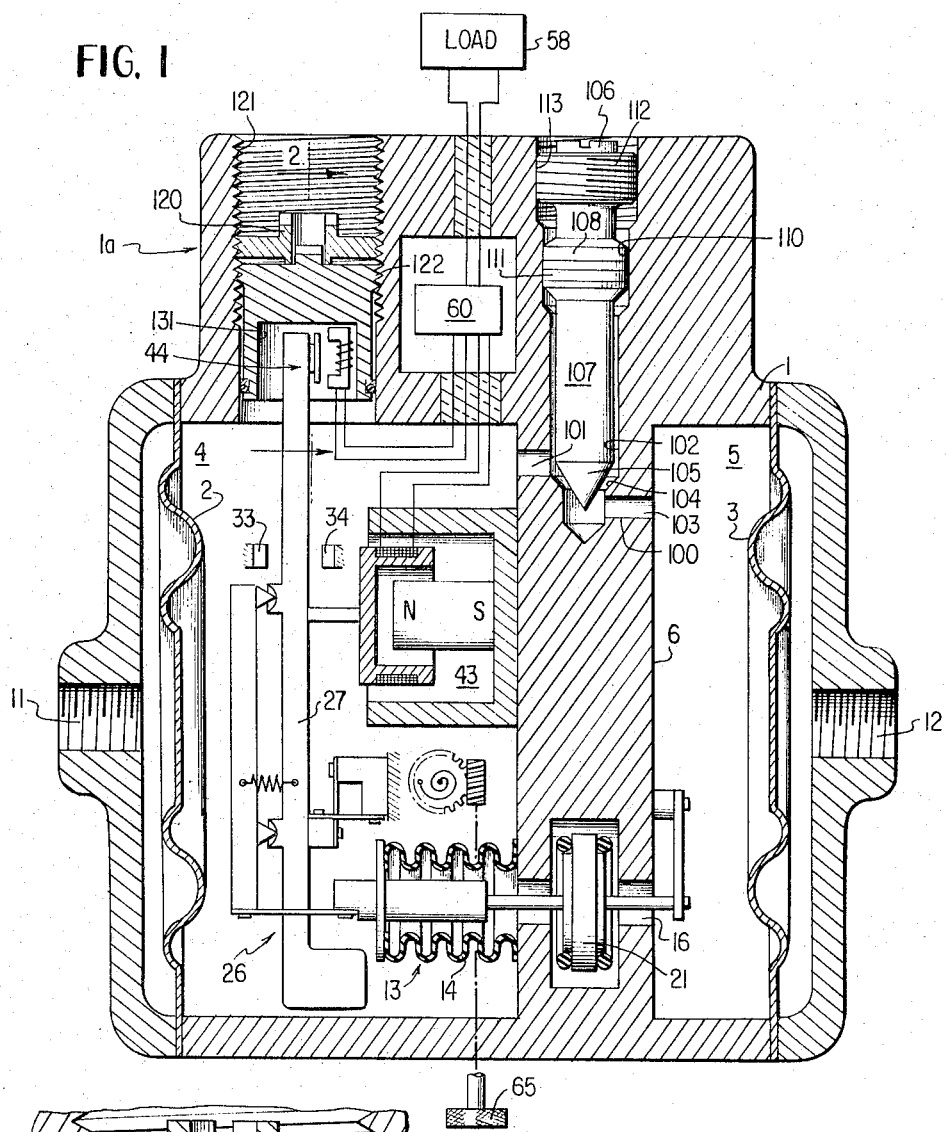
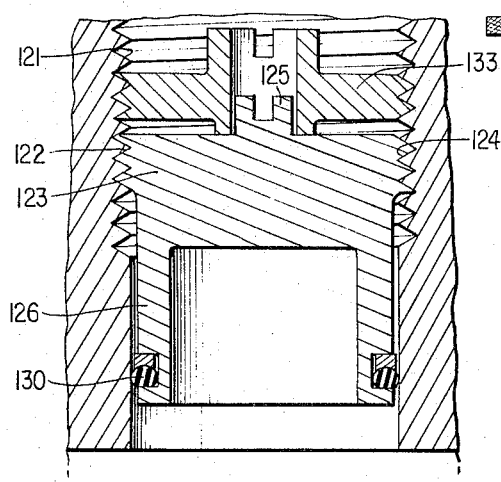
FIG. 2
*INVENTOR.*
DAVID A. BRISTOL
BY *Richard E. Horley*
ATTORNEY

United States Patent Office 3,372,594
Patented Mar. 12, 1968

3,372,594
COMPENSATION SYSTEM FOR DIFFERENTIAL PRESSURE MEASURING DEVICE
David A. Bristol, Lynnfield, Mass., assignor to General Electric Company, a corporation of New York
Filed Apr. 11, 1966, Ser. No. 541,774
4 Claims. (Cl. 73—398)

This invention generally relates to differential pressure measuring devices and more particularly to an improved compensation system for such a pressure measuring device.

Pressure measuring devices to which this invention is particularly adapted generally include a hollow casing which is divided into four chambers by a central rigid partition and two flexible diaphragm members. Liquid fills the space formed between each diaphragm member and the rigid partition, and variable pressures are applied to the diaphragms causing a pressure differential to exist between each volume of liquid. This pressure differential is sensed by a servo system and converted to an output thereby. Such a differential pressure measuring device is shown in the application of Harold E. Trekell, Ser. No. 451,547, "Pressure Measuring Device," filed Apr. 28, 1965, and assigned to the same assignee as the present invention.

It has been found that such a differential pressure system may be subject to errors caused by ambient temperature and static pressure variations. Generally, these errors have been eliminated by using seals of especial flexibility such as bellows, by providing equal liquid volumes, by selecting closely matched diaphragms or by compensating during manufacturing such as by varying the liquid quantity in one of the two liquid chambers.

It is an object of this invention to provide a differential pressure measuring device of the class described wherein liquid quantity changes in the chambers are facilitated.

Another object of this invention is to provide a differential pressure measuring device of the class described wherein liquid quantity changes in the chambers are made by transferring liquid between the chambers.

If liquid is merely transferred between chambers, a change in the relative physical configuration of the diaphragms occurs. For example, one diaphragm can become convex and the other concave. Such a change in relative configurations of the diaphragms causes a change in their relative operating characteristics.

Still another object of this invention is to provide a differential pressure measuring device of the class described which can be compensated while maintaining both diaphragms in the same relative configuration.

Briefly, this invention can be used with a pressure sensitive device which incorporates two liquid-filled chambers by providing a controllable, valve-operated passage between the two chambers to permit liquid to be transferred from one chamber to the other. In order to maintain both diaphragms in a similar physical configuration, an expansible chamber means is used to vary the volume of one chamber.

The invention has been pointed out with particularity in the appended claims. A more thorough understanding of the above and further objects and advantages of the present invention can be more fully appreciated by reference to the following description taken in conjunction with the drawings wherein:

FIGURE 1 illustrates a pressure-sensitive device adapted to use this invention, and FIGURE 2 presents an enlarged sectional view along lines 2—2 in FIGURE 1 to show an alternate view of an expansible chamber device.

In order to completely and clearly understand the calibration system and its use with a pressure sensitive device, it will be helpful to consider the improvement as applied to the particular pressure measuring device revealed in Ser. No. 451,547. As the particular pressure measuring device is clearly and completely described in that application, the operation of the device is described herein in terms of that application including the numerical designations therein to serve as background for this invention.

In use, inlet and outlet connections 11 and 12 in a hollow casing are connected to pressure lines for measuring a difference in fluid pressure in such lines. They may, for example, be pressure lines leading from the upstream and downstream sides of an orifice or venturi disposed in a conduit carrying process fluid, the flow of which is to be measured or controlled.

Any difference in the pressure at the inlet conduits 11 and 12 is transmitted to liquid chambers 4 and 5 defined by hollow casing 1, rigid partition 6 and flexible isolating diaphragms 2 and 3. This difference appears across a flexible pressure sensitive element 13 which experiences a force proportional to the pressure difference. This force is applied to a lever system 26 tending to cause rotation thereof. A counterbalancing force is applied to lever system 26 by a force motor 43, and the magnitude of the force applied is controlled by a position detector 44 to maintain the lever system in a state of balance. The current applied to the force motor 43 is proportional to the counterbalancing force, which is, in turn, proportional to the differential pressure force exerted by pressure sensitive element 13. Hence, the current magnitude in the force motor 43 is an indication of the differential pressure being measured, and this current is used to actuate load device 58, which may be a meter, recorder or a differential pressure control device. After the pressure span of the device is selected by varying an electrical circuit 60, the current load 58 for the minimum differential pressure to be measured is adjusted by rotating a zero set knob 65. In addition, protection of the device from over-pressure is provided by means of stops 33 and 34 which limit the movement of lever 27 and by valve 21 which closes conduit 16 and thereby isolates the interior of a bellows 14 from further pressure increases in one or the other of the chambers. This provides an automatic over-pressure device which does not interfere with the sensitivity and delicate force measuring operation of the balance lever system 26 during normal pressure conditions in the range being measuring.

Liquid is transferred between chambers 4 and 5 by a fluid passageway 100 extending through rigid partition 6 and including a first conduit portion 101, a valve chamber 102 and a second conduit 103. Valve chamber 102 includes a valve seat 104 which co-acts with a plug 105 formed on a screw member 106 which includes a threaded portion 112 for engaging a threaded surface on a passageway 113 extending through a casing extension 1a. Screw member 106 additionally includes a stem 107 between plug 105 and a closure body 108 which fits closely to the surface of an aperture 110. Sealing gaskets or O-rings 111 constitute a liquid seal to prohibit liquid loss from valve chamber 102. When plug 105 seats on the valve seat 104, no liquid can be transferred between chambers 4 and 5. However, if the plug 105 is unseated then liquid can be transferred between chambers 4 and 5. In addition, if screw member 106 is completely removed, passageway 113 and conduits 101 and 103 constitutes a means for filling chambers 4 and 5.

Referring now to FIGURES 1 and 2, the volume of one chamber, shown as chamber 4, is varied by a volume adjusting means 120 disposed within a threaded passageway 121 extending through casing extension 1a from an exterior portion thereof to liquid chamber 4. A generally cylindrical cap member 122 provides volume adjustment and comprises a solid cylindrical body portion 123 including a threaded portion 124 for engaging a threaded portion of passageway 121 and a turning means 125, shown as a kerfed member. Extending from body portion 123 toward the chamber 4 is an open-ended, hollow cylindrical extension 126 which includes a circumferential slot cut in the outer surface thereof to receive a sealing means 130 to thereby prohibit liquid flow from chamber 4 past the cap 122. The cylindrical extension 126 additionally defines the closed end of a chamber 131, the opening of which faces chamber 4. Chamber 131 is constructed, in this particular embodiment, to receive the detector 44 of the force balance system. However, as will be obvious to those skilled in the art the position of the volume adjustment means 120 is not critical.

As cap 122 is turned, it advances along the threads to alter the total volume of chamber 4 and chamber 131. Cap 122 is locked in position by means of a locking element 133 in a manner well known in the art.

There are two general categories of possible errors in a differential pressure measuring device of a class described. A first category includes temperature and static pressure errors caused by liquid pressure changes in a chamber when an adjacent diaphragm member moves. This motion may occur whenever temperature or static pressure changes alter the liquid volume and thereby cause the liquid pressure change in one chamber to vary a different amount from that in the other chamber. This causes an output error. There are several sources of this category of error. For example, although both chambers 4 and 5 are designed to have equal liquid volumes, the chamber volumes may not be equal initially due to manufacturing tolerances so that a change in either temperature or static pressure causes unequal volume changes in each chamber. There may also be differences in the operating characteristics of the two diaphragms which cause different pressure changes for identical liquid volume changes. However, errors from either sources respond linearly to ambient condition changes, so a single compensation method is sufficient. Thus, after the potential error magnitude has been determined, but before the chambers are filled with liquid, volume adjusting means 120 is positioned to initially minimize the errors.

A second category of errors includes those caused by common mechanical and electrical phenomena such as differences in thermal coefficients of expansion and thermal shifts in amplifier gain. Usually, the components are designed to minimize the errors so that the net error is zero. However, if there is a net error, it can also be corrected by proper positioning of volume adjusting means 120. As static pressure errors are generally small in comparison to temperature errors, this additional adjustment does not significantly affect the static pressure error.

After this initial error compensation has been made, the differential pressure measuring device is filled with liquid, and screw member 106 is inserted and tightened. A temperature test is then conducted to determine the actual value of temperature errors resulting from inaccuracies of the prior adjustments. The results of these tests determine the quantity of liquid which must be transferred between chambers 4 and 5. Liquid transfer is accomplished by unseating valve plug 105 and advancing or retracting cap 122 a particular number of threads. Assuming that the diaphragm operating characteristics are approximately the same, a change of two units of liquid volume in chamber 131 causes one unit of liquid volume change in each of chambers 4 and 5. As liquid is incompressible, each diaphragm is also displaced by one unit of volume. For example, an increase of two units of liquid volume of chamber 131 causes both chambers 4 and 5 to decrease one unit of liquid volume. However, since chamber 131 is an extension of chamber 4, the total volume of chamber 4 actually increases by one unit of liquid volume. At the same time diaphragms 2 and 3 are displaced inwardly by one unit of volume. When this adjustment has been completed, screw member 106 is tightened to close the valve and locking element 133 is also tightened.

There are two variations to this compensation scheme which can be used if only small corrections are required. Liquid may merely be transferred by unseating valve plug 105 and applying pressure to one or the other of the flexible diaphragms 2 or 3. Alternatively, cap 122 can be varied without unseating valve plug 105. However, this latter type of change simply causes a change in the characteristics of one diaphragm and should be used only in minor corrections.

Although a preferred embodiment of the compensation system which forms this invention has been shown in the schematic form in association with a particular pressure-sensitive device, it will be obvious to those skilled in the art that various embodiments are possible and can be made without departing from the true spirit and scope of the invention. For example, other means could be used to transfer liquid between chambers. In addition, there are a large number of different expansible chamber devices which could be utilized in place of the cap structure shown above.

Therefore, the appended claims are intended to cover all such variations as come within the true spirit and scope of this invention.

What is claimed as new and desired to be secured by Letters Patent of the United States is:

1. In a pressure sensitive device comprising a hollow casing, a pair of flexible isolating diaphragms mounted in the casing and defining therewith a space adapted to contain a liquid, a rigid partition in the casing dividing the space into two chambers, a flexible pressure-sensitive device having a first side exposed to liquid pressure in one chamber and a second side exposed to liquid in the other chamber and means for converting a pressure differential on the pressure-sensitive device to an electrical output signal, the improvement of a compensation system for the pressure sensitive device for correcting errors caused by ambient temperature and static pressure changes including:
  (A) valve means having an open and closed position located in the casing,
  (B) first conduit means in the casing from one of the chambers to said valve means,
  (C) second conduit means in the casing extending from the other chamber to said valve means, said valve means connecting said first and second conduit means whereby liquid in said chambers can be transferred from one chamber to the other when the valve is open.

2. A pressure-sensitive device as recited in claim 1 wherein the valve means includes a valve seat located in the rigid partition and a valve movably located in the housing for selective engagement with said valve seat, said first and second conduit means being located in said rigid partition.

3. In a pressure-sensitive device comprising a hollow casing, a pair of flexible isolating diaphragms mounted in the casing and defining therewith a space adapted to contain a liquid, a rigid partition in the casing dividing the space into two chambers, a flexible pressure-sensitive device having a first side exposed to liquid pressure and one chamber and a second side exposed to liquid pressure in the other chamber and means for converting a pressure differential on said flexible pressure-sensitive device to an electrical output signal, the improvement of a compensation system for the pressure-sensitive device for correcting errors caused by ambient temperature and static pressure changes including:
  (A) liquid transfer means for transferring liquid from one chamber to the other comprising:
    (a) first conduit means located in said rigid partition having one end thereof communicating with said first chamber,
(b) second conduit means located in said rigid partition having one end thereof communicating with the other chamber,
(c) a valve chamber located in the rigid partition for connecting said first and second conduit means, and
(d) valve chamber closure means located in said housing for selectively opening and closing said valve chamber means to block and selectively block fluid flow between said chambers and to permit fluid flow between said chambers, and (B) expansible chamber means in said casing and in communication with one of the chambers to vary the volume thereof.

4. A pressure-sensitive device as recited in claim 3 wherein said expansible chamber means comprises:
(A) a passageway through the casing between the exterior thereof and one of the chambers, and
(B) movable closure means in sealing engagement with the casing and movable within said passageway to vary the volume of the chamber.

References Cited

UNITED STATES PATENTS

| | | | |
|---|---|---|---|
| 3,158,000 | 11/1964 | Aldinger | 73—407 |
| 3,198,421 | 8/1965 | Alyea | 230—21 |
| 3,342,072 | 9/1967 | Trekell | 73—398 |

LOUIS R. PRINCE, *Primary Examiner.*

D. E. CORR, *Assistant Examiner.*